United States Patent
Addy

(10) Patent No.: US 6,208,694 B1
(45) Date of Patent: *Mar. 27, 2001

(54) REDUCED POWER SUPERVISORY MESSAGE TRANSMISSION IN A WIRELESS ALARM SYSTEM

(75) Inventor: Kenneth L. Addy, Massapequa, NY (US)

(73) Assignee: Pittway Corp., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/998,504

(22) Filed: Dec. 26, 1997

Related U.S. Application Data

(63) Continuation-in-part of application No. 08/516,162, filed on Aug. 17, 1995
(60) Provisional application No. 60/043,737, filed on Apr. 21, 1997.

(51) Int. Cl.[7] ............................ H04L 27/00; H04L 27/04; H04L 27/06; H03D 3/24
(52) U.S. Cl. ......................... 375/259; 375/312; 375/344; 375/376
(58) Field of Search ..................................... 375/259, 312, 375/344

(56) References Cited

U.S. PATENT DOCUMENTS

| 4,367,557 | 1/1983 | Stern et al. . |
| 4,754,261 | 6/1988 | Marino et al. . |
| 5,461,365 | 10/1995 | Schlager et al. . |
| 5,828,300 | 10/1998 | Addy et al. . |

FOREIGN PATENT DOCUMENTS

| 733 988 A2 | 9/1996 | (EP) . |
| WO 91/14244 | 3/1991 | (WO) . |

OTHER PUBLICATIONS

UL Regulation 864 "Control Units for Fire–Protective Signaling Systems".

*Primary Examiner*—William Luther
(74) *Attorney, Agent, or Firm*—Greenberg Traurig, LLP; Anthony R. Barkume

(57) ABSTRACT

A self testing wireless data communications system suitable for use with an alarm system, the transmitting element of the communications system is capable of transmitting at two different output power levels. If the message is a supervisory message, it is transmitted at a lower power level than an alarm message, in order to ensure that non-supervisory alarm messages are received with an adequate signal margin.

29 Claims, 7 Drawing Sheets

REDUCED POWER SUPERVISORY MESSAGE TRANSMISSION IN A WIRELESS ALARM SYSTEM

CROSS-REFERENCE TO RELATED APPLICATIONS

This patent application is a continuation-in-part of co-pending U.S. application Ser. No. 08/516,162, which was filed on Aug. 17, 1995, which is incorporated by reference herein. This application also claims priority of co-pending U.S. provisional application Ser. No. 60/043,737, which was filed on Apr. 21, 1997.

BACKGROUND OF THE INVENTION

The present invention relates to communications devices and protocols such as those used in wireless alarm systems having multiple sensors in communication with one or more receiver control units; and in particular to such alarm systems where the transmitting element of the system is designed to transmit messages at different power levels.

Most radio frequency (RF) wireless security systems available today, such as those manufactured by Alarm Manufacturing Device Co. (ADEMCO) 165 Eileen Way, Syosset, N.Y. 11791, employ a multiplicity of transmitters in communication with a central receiver control unit. The information transmitted typically describes the state of various transducers or sensors associated with each transmitter, such as smoke, motion, breaking glass, shock and vibration detectors; door, window and floor mat switches; etc. These transmitters are designed to be inexpensive to manufacture and generally are capable of transmission only rather than reception only or transmission and reception, which would add significant cost to the design. In order to meet certain regulatory agency requirements, the transmitters must periodically transmit supervisory messages to the central receiver control unit in order to identify potential problems with the communication link from any transmitter in the alarm system as soon as possible. The supervisory message (as well as a normal alarm message) comprises a unique embedded identification code, which serves to identify to the central receiver control unit the source of the particular supervisory message (or alarm message). Typically, when a supervisory message is properly received and detected by the central receiver control unit, the identification code is made available to the remainder of the system for further processing.

For Safety of Life applications, where an alarm condition may signify a health or security emergency, the RF wireless system must also comply with more stringent regulations, such as Underwriters Laboratories regulation UL864. This regulation requires that supervisory messages be transmitted at a reduced power level below that of the alarm message (i.e. normal, non-supervisory signals) by a minimum of 3 dB. Equivalent means may be utilized as long as the transmission of alarm messages comprises an effective power margin over that of the periodic transmission of supervisory messages sent by each transmitter in the alarm system.

Therefore, it would be advantageous if the alarm system would transmit supervisory messages at a power level below that of alarm messages, thereby ensuring that the transmission of alarm messages would have an effective margin over that of the periodic transmission of the supervisory message from each transmitter in the alarm system. Such a feature would be most beneficial if it could be applied without substantial modification to existing receivers already in commercial use.

Additional considerations may be found to hinder the implementation of such a concept such as overall cost, and various system parameters comprising message formats and protocols and repetition of messages. The ideal implementation would be transparent to such parameters that could very well differ from country to country or even among different manufacturers.

Therefore, it would be advantageous if the alarm system would provide a cost effective means for reducing the transmitted signal power of supervisory messages and also transmit alarm messages at full power, which is independent of such parameters as message format, repetition of messages, etc. Such a system would likely require differentiation between supervisory and alarm message in the transmitter prior to transmission.

SUMMARY OF THE INVENTION

In accordance with these and other objects, the present invention utilizes a method for periodically self-testing a communications path in wireless alarm systems, which comprises timing a supervisory period to provide a delay between transmissions of supervisory messages, generating a supervisory message, generating a transmission power control signal comprising one of at least two states upon termination of the supervisory period, and transmitting the supervisory message at a reduced power level as indicated by the state of the transmission power control signal. The present invention also utilizes the steps of generating an alarm status message in response to receipt of an alarm status signal from an alarm sensor, generating the transmission power control signal in response to receipt of the alarm status signal from the alarm sensor, and transmitting the alarm status message at a normal power level as indicated by the state of the transmission power control signal.

The present invention is embodied by an apparatus for periodically self-testing a communications path in wireless alarm systems, which comprises supervisory period timing means for timing a duration of a supervisory period existing between transmissions of supervisory messages, means for outputting a supervisory period termination signal upon termination of the supervisory period, message generation means for generating the supervisory message and a transmission power control signal, the transmission power control signal comprising one of at least two states, and transmission means for transmitting the supervisory message at a predetermined reduced power level in response to a first state of the transmission power control signal.

The present invention is also characterized as being embodied in an alarm sensor transmitter for use in a wireless alarm system, which comprises a supervisory period timer which times a duration of a supervisory period existing between transmissions of supervisory messages and outputs a supervisory period termination signal upon termination of the supervisory period, a message generator which generates the supervisory message and a transmission power control signal in response to the supervisory period termination signal, the transmission power control signal comprising at least two states, the message generator generating an alarm status message and the transmission power control signal in response to receipt of an alarm status signal from an alarm sensor, a radio frequency transmitter which transmits the supervisory message at a predetermined reduced power level in response to the state of the transmission power control signal and transmits the alarm status message at a predetermined normal power level in response to the state of the transmission power control signal, the radio frequency transmitter modulating the transmission signal with the generated supervisory message and the alarm status message and outputting the modulated transmission signal, an oscillator which outputs a data clock signal for synchronizing the message generator and a phase detection clock signal for synchronizing the radio frequency transmitter, the data clock signal and the phase detection clock signal being substantially in phase with each other, and a phase lock loop circuit which substantially maintains correlation between a phase of the transmission signal and a phase of the phase detection clock signal.

Thus, the present invention is also embodied in a data communications method and system comprising a plurality of remote devices, each comprising means for transmitting supervisory messages and non-supervisory messages at different power levels, and a receiver providing means for receiving such messages.

The present invention is based on the premise that system reliability and integrity are improved if supervisory messages are transmitted at lower power relative to the power of alarm transmissions. This invention provides a unique method of accomplishing the stated objectives without increasing receiver cost or complexity and without increasing on-air time to provide unique supervisory message formats.

The first requirement of the transmitter is that it should have the ability to generate a certain logic level during the time period when a supervisory message is being generated. This logic level may then be used to control analog circuitry, which in-turn controls output power.

The transmitter implemented in the present invention is based on a unique Application Specific Integrated Circuit (ASIC), although those skilled in the art will recognize that discrete component implementations, such as those comprising a microcontroller or microprocessor, could achieve similar results. The ASIC includes logic circuitry to generate the messages that are to be transmitted, and in addition includes the RF circuits required to generate a modulated RF signal ready for transmission. During the generation of a supervisory message, the ASIC outputs a logic level on an output pin (SUPXMI) which is used to control output power. There are various methods available to achieve this power reduction; such as control of amplifier current, switching of a load across the output, or switching of reactive elements in tuned circuits. Those skilled in the art will recognize that the power control can be completely self contained within the ASIC as well as being brought to external circuitry.

The transmitted signals are received and decoded and checked for valid CRC etc., however since supervisory messages are transmitted at lower power, there is an effective built-in system margin for alarm messages.

DETAILED DESCRIPTION OF THE PREFERRED EMBODIMENT

Figure 1:
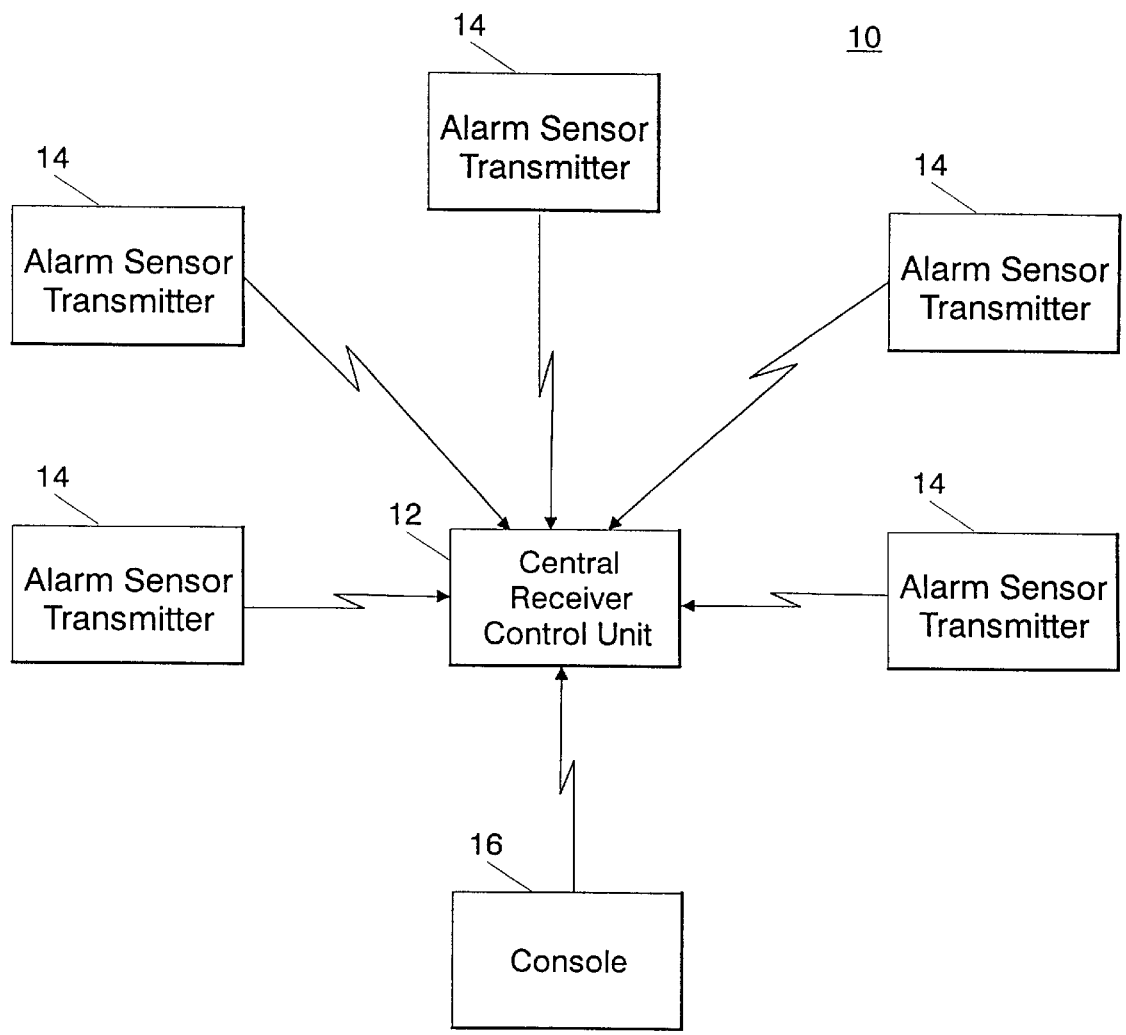
FIG. 1 is a block diagram of an alarm system utilizing reduced power supervisory message transmission of the present invention.

FIG. 1 illustrates a block diagram of an alarm system 10, which comprises a central receiver control unit 12, a plurality of alarm sensor transmitters 14, and a console 16. The central receiver control unit 12 is in communication with the plurality of alarm sensor transmitter 14, each of which comprise an alarm sensor and a transmitter. The alarm sensor transmitters 14 are well known in the art and comprise, for example, motion detectors, fire or smoke sensors, glass breakage detectors, door or window entry sensors, and similar sensors. In the preferred embodiment, the alarm system 10 operates in a so-called "wireless" fashion by electromagnetic wave transmission (e.g., radio frequency waves) between the alarm sensor transmitters 14 and the central receiver control unit 12. The transmitters within each alarm sensor transmitter 14 are also well known in the art, and transmit supervisory and alarm messages which modulate a radio frequency signal (e.g., 345 MHz). The modulated radio frequency signal is received, processed and decoded by the central receiver control unit 12, enabling the central receiver control unit 12 access to be provided with the information contained within the supervisory or alarm message and act accordingly (e.g., by sounding an alarm speaker, dialing the police or fire station, etc.). Further detail regarding wireless alarm systems may be found in U.S. Pat. No. 4,754,261 to Marino, which is owned by the assignee of the present invention and is hereby incorporated by reference.

The alarm sensor transmitters 14 are designed to transmit supervisory messages and alarm messages indicating the status of the alarm sensors in accordance with protocols well known in the art. The supervisory message functions to provide a periodic and continuous Built-in-Test (BIT) capability which ensures that communication between each alarm sensor transmitter 14 and the central receiver control unit 12 is operative. Since it is possible in this type of system that an alarm sensor transmitter 14 may only transmit an alarm signal during a health, safety or security emergency (e.g., when a window associated with the sensor is broken), it is imperative that the alarm system 10 maintain a periodic method of ensuring the communication link between each of the alarm sensor transmitters 14 and the central receiver control unit 12 is operative so that potential problems may be attended to promptly at non-critical moments.

Figure 2:
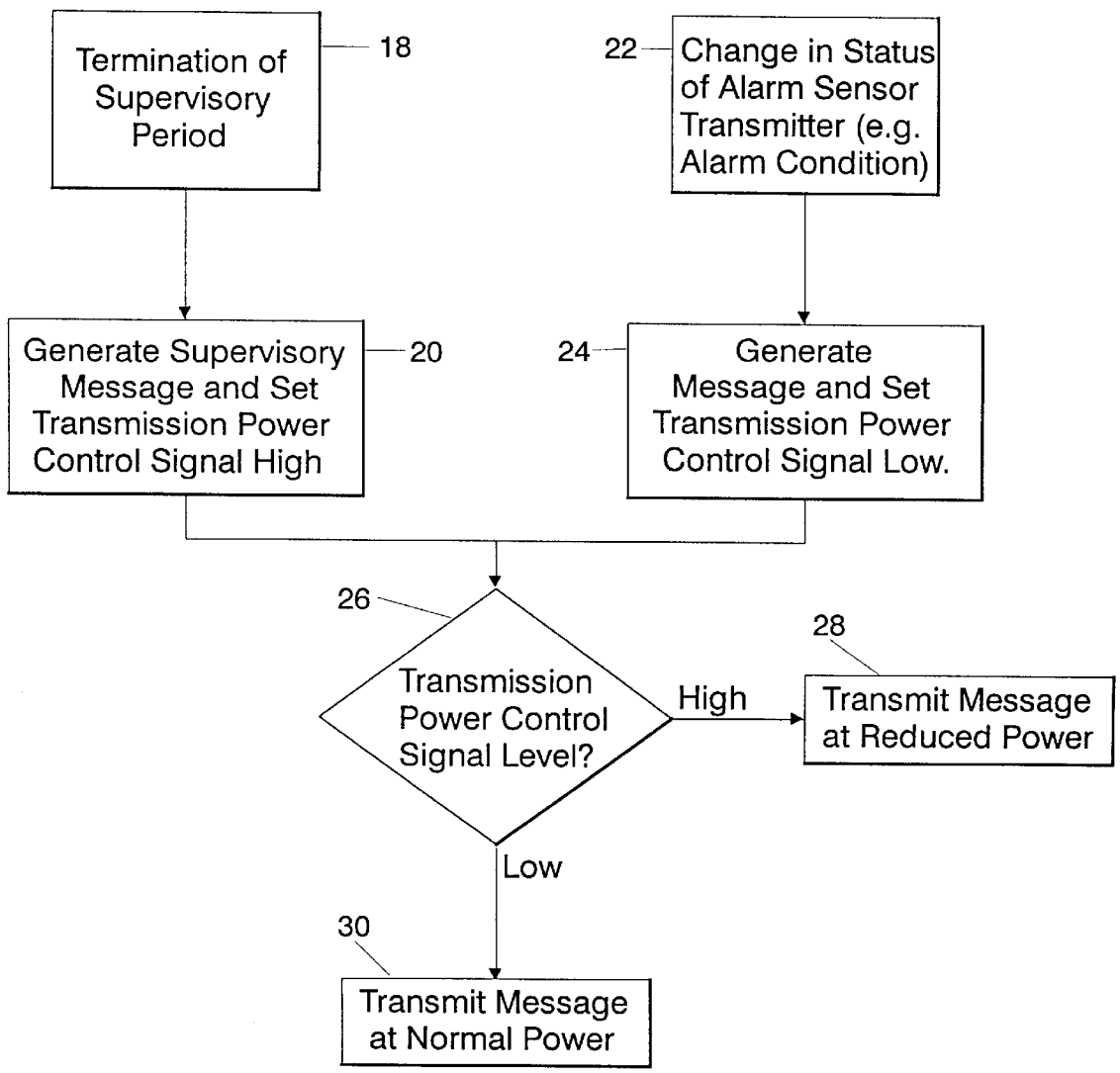
FIG. 2 is a flowchart of a method employed by the alarm sensor transmitter of FIG. 1 to reduce transmission power of supervisory messages.

FIG. 2 illustrates a method utilized by the alarm sensor transmitters 14 to determine when to reduce the transmitted power (i.e. upon termination of a supervision signal). Upon termination of the supervisory period (defined below) in step 18, a supervisory period termination signal will be generated which will in turn prompt the generation of the supervisory message in step 20. A transmission power control signal will simultaneously be set high (i.e. logic 1) indicating that the supervisory message should be transmitted at a reduced power level. However, if the supervisory period has not terminated yet and there has been a change in the status of one or more of the alarm sensor transmitters 14 (i.e., a non-supervisory condition) in step 22 then a non-supervisory message (an alarm message) will be generated in step 24 and the transmission power control signal will be set to low (logic 0). Naturally, the sense of the transmission power control signal is arbitrary, as long as it is defined in advance and the intended tasks take place accordingly in response to a given sense. Just prior to transmission, the transmitter will examine the transmission power control signal in decision 26 and if it is high (indicating that the message is a supervisory message), then the transmitter will transmit the message at a predetermined reduced power level in step 28. However, if the transmission power control signal is low (indicating that the message is a non-supervisory message), then the transmitter will transmit the message at a predetermined normal or maximum power level in step 30.

Figure 3A:
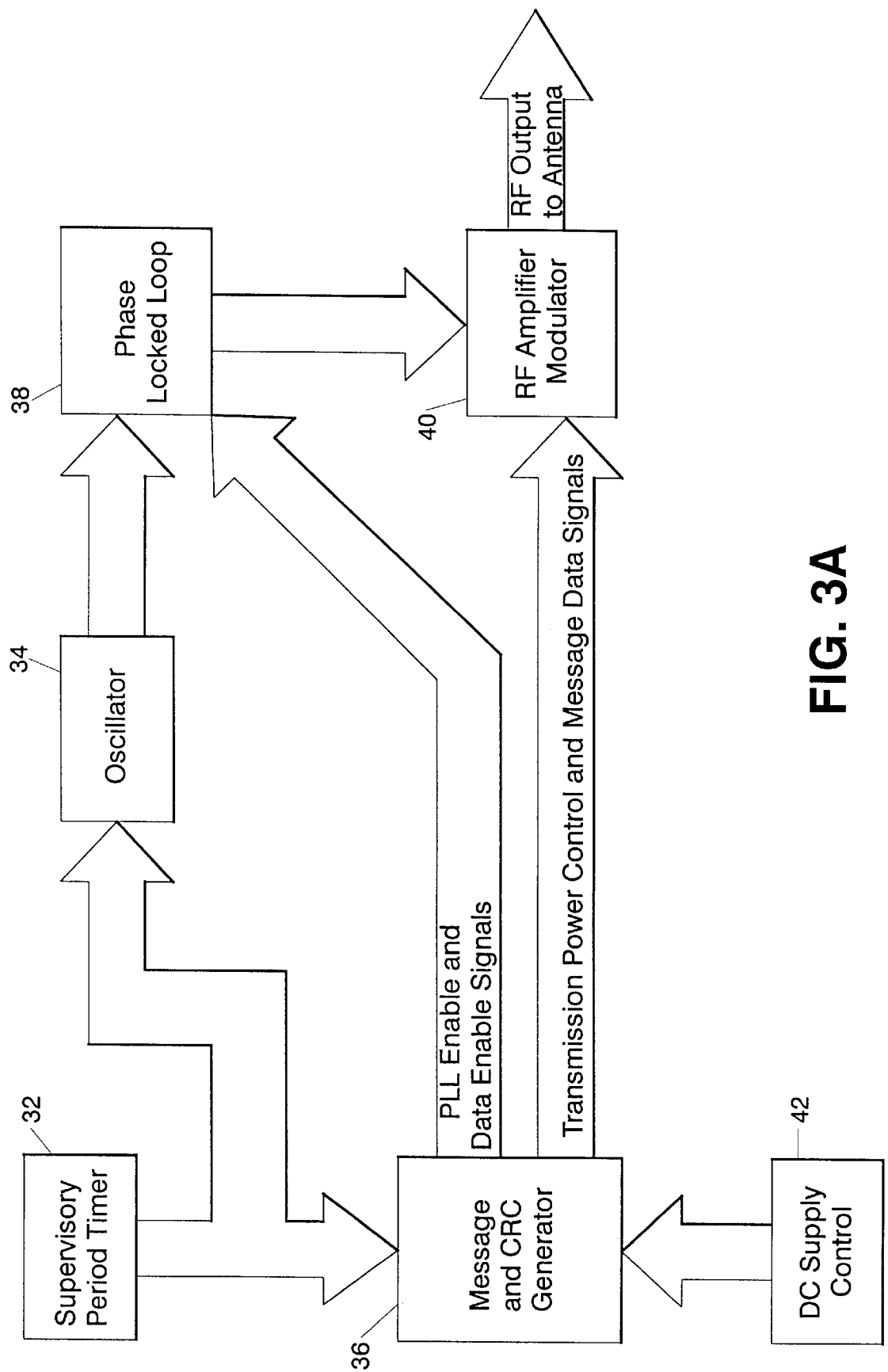
FIGS. 3A and 3B are block diagrams of an alarm sensor transmitter of the alarm system of FIG. 1.
Figure 3B:
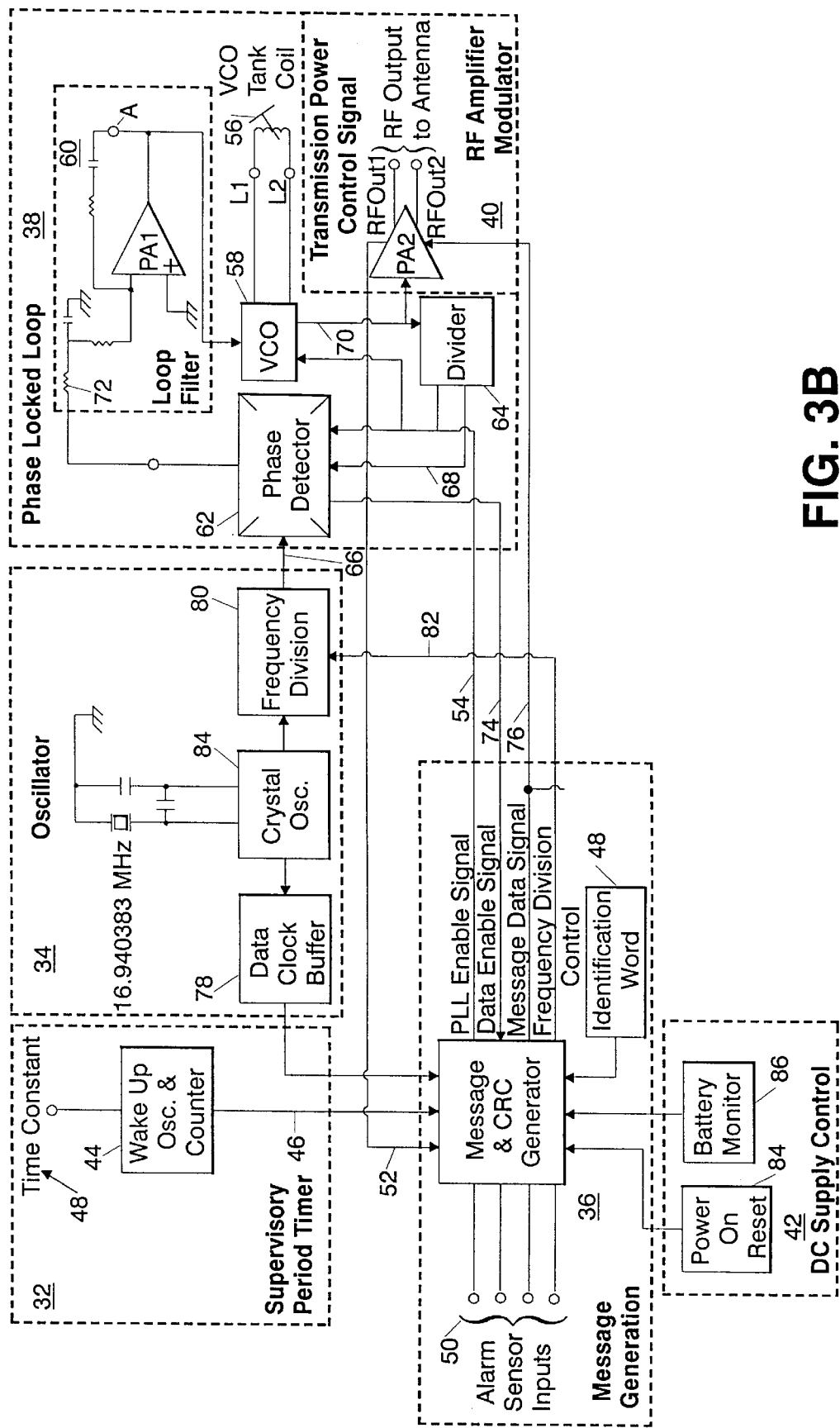

FIGS. 3A and 3B illustrate detailed top-level block diagrams of some of the essential functions of the alarm sensor transmitter 14 comprising a supervisory period timer function 32, an oscillator function 34, a message generation function 36, a phase locked loop function 38, a radio frequency (RF) amplifier modulator function 40, and a DC supply control 42. The supervisory period timer 32 comprises a wake-up oscillator and counter 44 that runs continuously and counts the passage of time. Whenever a period of time corresponding to the supervisory period has elapsed, then the wake-up oscillator and counter 44 will output a supervisory period termination signal 46 to the message generation function 36. The length of time corresponding to the supervisory period is fixed by a time constant 48 that may comprise a circuit comprising resistors and capacitors, a crystal, a resonator or other alternative components well known in the art. The length of the supervisory period is typically on the order of one hour or less according to applicable national regulations.

Upon receipt of the supervisory period termination signal by the message generation function 36, the supervisory message is synthesized from a unique identification word 48 stored in non-volatile memory, a Cyclic Redundancy Check (CRC) sequence, and a status byte formed from various external status inputs comprising alarm sensor inputs 50. The unique identification word 48 identifies the source of the supervisory message as coming from a particular alarm sensor transmitter 14. The CRC sequence is provided for error detection and is well known in the art (see for example W. Stallings *Data and Computer Communications* 101–110 (1985), which is hereby incorporated by reference). In addition, since the supervisory message is being transmitted, the transmission power control signal 52 transitions to a high state that is then used to control the transmission power established in the RF amplifier modulator function 40. Conversely, if a non-supervisory message (an alarm message) is being generated in response to a change in the status of one or more alarm sensor inputs 50, then the transmission power control 52 signal would maintain or transition to a low state which will cause the RF amplifier modulator function 40 to transmit the non-supervisory message at the predetermined normal or maximum power level.

Prior to outputting the generated message, the message generation function 36 will enable the phase locked loop function 38 using a PLL ENABLE signal 54. Conceptually, phase locked loop circuits utilize feedback to maintain an output signal in a specific phase relationship to a reference signal. Here the phase locked loop function 38 serves to maintain the phase difference between the oscillator function 34 and the signal that is modulated by the message data signal 76. The modulated signal of VCO output signal 70 is typically between 417 MHz and 433 Mhz. The phase locked loop function 38 is comprised of a voltage-controlled oscillator (VCO) 58, a loop filter 60, a phase detector 62 and a divider 64. The phase detector 62 comprises a device that produces an output voltage proportional to the phase difference between an phase detection clock 66 and a divider output signal 68. The VCO 58 is a circuit that produces a VCO output signal 70 whose frequency is proportional to the loop filter voltage at node A. The divider 64 is a device that produces a divider output signal 68 whose frequency is an integer division of the VCO output signal 70. The loop filter 72 is a circuit that is used to shape the overall response of the phase locked loop function 38. The loop filter illustrated in FIGS. 3 and 3B is an active loop filter comprising an operational amplifier PA1 and additional discrete resistors and capacitors. When the phase locked loop 38 is locked it issues a DATA ENABLE signal 74 to the message generation function 36 which enables the transmission of the generated message or message data signal 76 to the RF amplifier modulator function 40.

The RF amplifier modulator function 40 modulates the VCO output signal 70 with the message data signal 76 and outputs the resulting modulated signal to an antenna. In the embodiment illustrated in FIGS. 3A and 3B, it is anticipated that On-Off Keying would be utilized, which essentially varies the amplitude of the carrier between zero and a predetermined amplitude in response to the message data signal 76. However, alternative methods of modulation such as Frequency-Shift Keying and Phase-Shift Keying could be employed while still remaining within the scope of the present invention.

The oscillator function 34 provides the message generation function 36 with a data clock via a data clock buffer 78 and a crystal oscillator 84 which is used for a general system clock as well as synchronization of the output data stream on the message data signal 76. The oscillator function 34 also provides the phase locked loop function 38 with the phase detection clock 66 after a frequency division function 80 controlled by a frequency division control signal 82 from the message generator function 36. The oscillator output reference clock is used as a phase reference which the phase locked loop function 38 bases the phase of the VCO output signal 70 on.

The DC supply control 42 comprises a power-on reset function 84, and a battery monitor function 86. The power-on reset function 84 provides a stable reset signal to the message generation function 36 in order to permit the orderly initialization of registers, clocks and voltage levels upon applying power to various circuits of the alarm sensor transmitter 14. The battery monitor function 86 ensures that the voltage of a battery used as the primary power source meets operating specifications and if not informs the message generation function 36 of that fact via the status portion of the message or equivalent means well known in the art.

Figure 4:
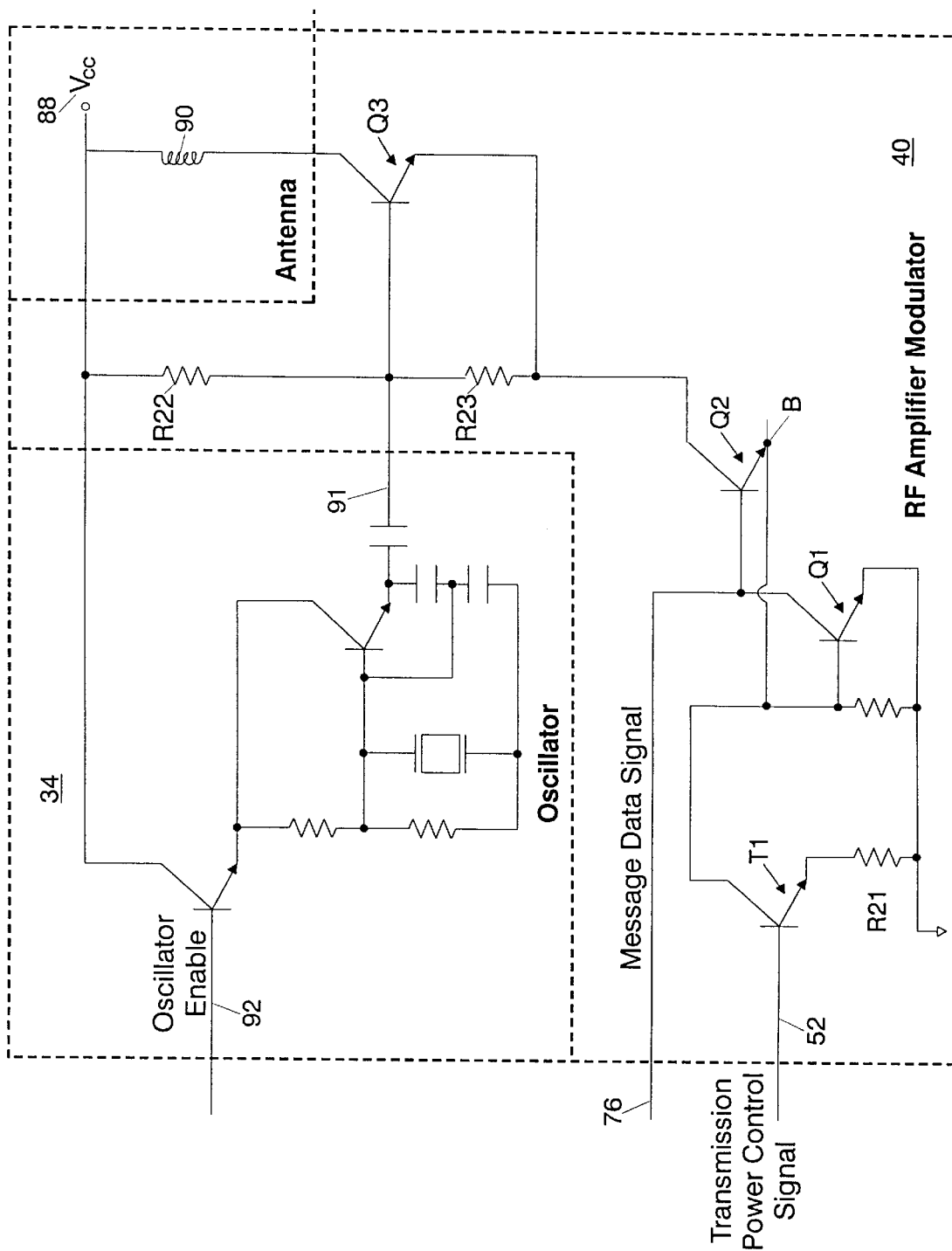
FIG. 4 is a schematic representation of an alternative embodiment of an oscillator function and an RF amplifier modulator function of FIGS. 3 that perform the reduced power supervisory message transmission of the present invention.

FIG. 4 illustrates an alternative embodiment of the oscillator function 34 and the RF amplifier function 40. The transmission power control signal 52 is used to switch a resistor R21 into or out of the circuit. Switching resistor R1 into the circuit operates to increase the current through a current source defined by transistors Q1 and Q2. Q1 and Q2 operate to maintain approximately 0.6v across resistor R1 and, therefore, the value of resistor R21 determines the current through the RF amplifier modulator function 88. Transistors Q1 and Q2 operate as a regulator since the power amplifier defined by transistor Q3, and resistors R22 and R23 as well as the antenna 90 are at a constant DC load. Thus, when resistor R1 is switched into or out of the circuit, the voltage across the power amp increases or decreases to vary output power. The oscillator function 34 provides an RF signal 91 (similar to the VCO output signal 70 of FIGS.

3A and 3B) which is enabled by an oscillator enable signal 92 and modulated by the message data signal 76 in a substantially similar manner as described with respect to FIGS. 3A and 3B. Thus, by varying the transmission power control signal 52 alarm (non-supervisory) messages may be transmitted, received and processed at full system power, and all supervisory messages are subject to a reduction in transmitter effective radiated power thus ensuring adequate system margin.

Figure 5:
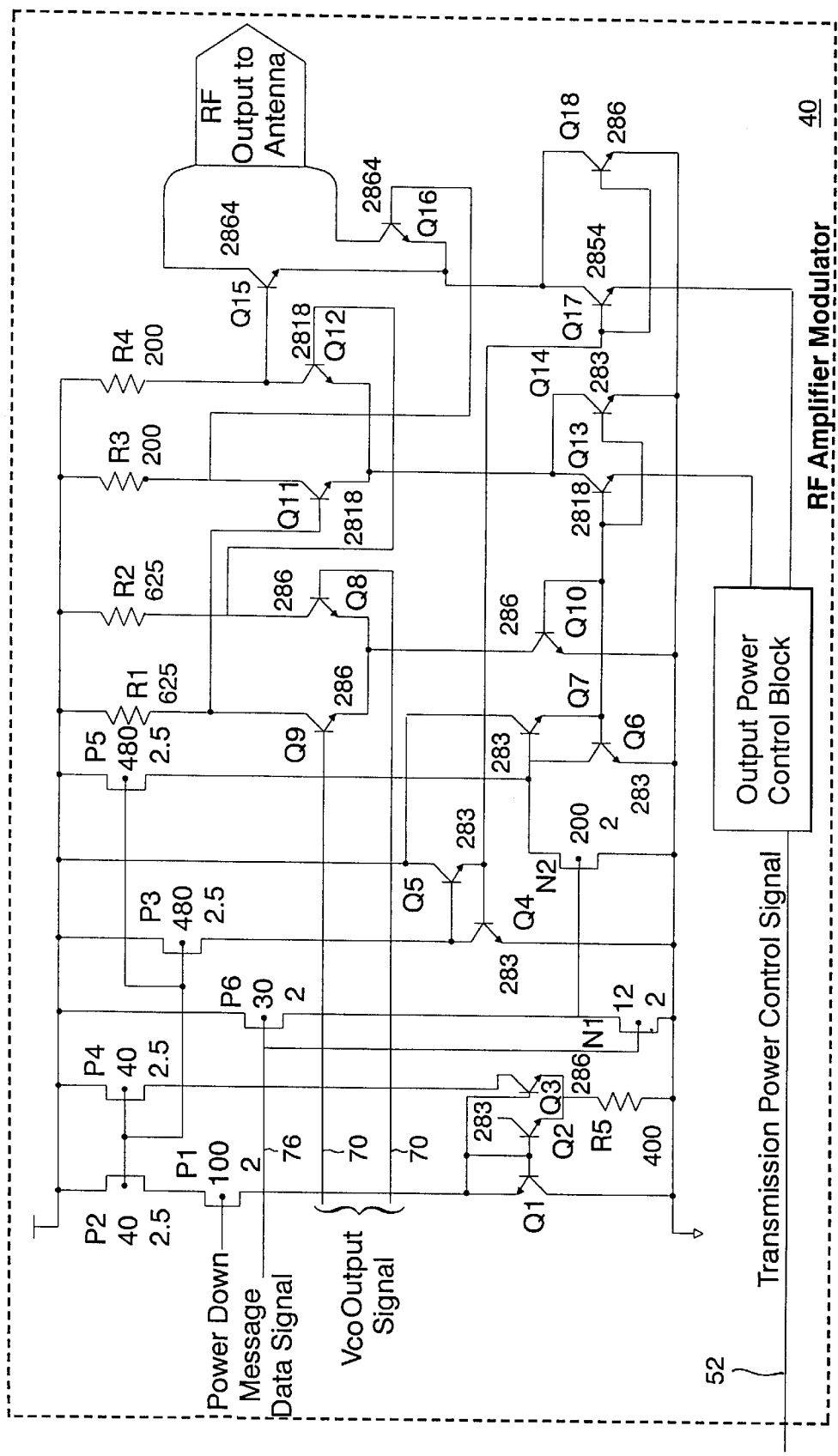
FIG. 5 is a schematic representation of a second embodiment of the RF amplifier modulator function of FIG. 2.

FIG. 5 illustrates a schematic representation of a second embodiment of the RF amplifier modulator function of FIG. 2. In addition to reference designations the individual components have been annotated with information regarding part numbers and values. In this embodiment the transmission power control signal 52 is used to control the output power by alternately connecting and disconnecting transistors Q13 and Q17. In order to achieve a low power transmission during supervisory messages both Q13 and Q17 will be disconnected via circuitry well known in the art contained in an output power control block.

Figure 6:
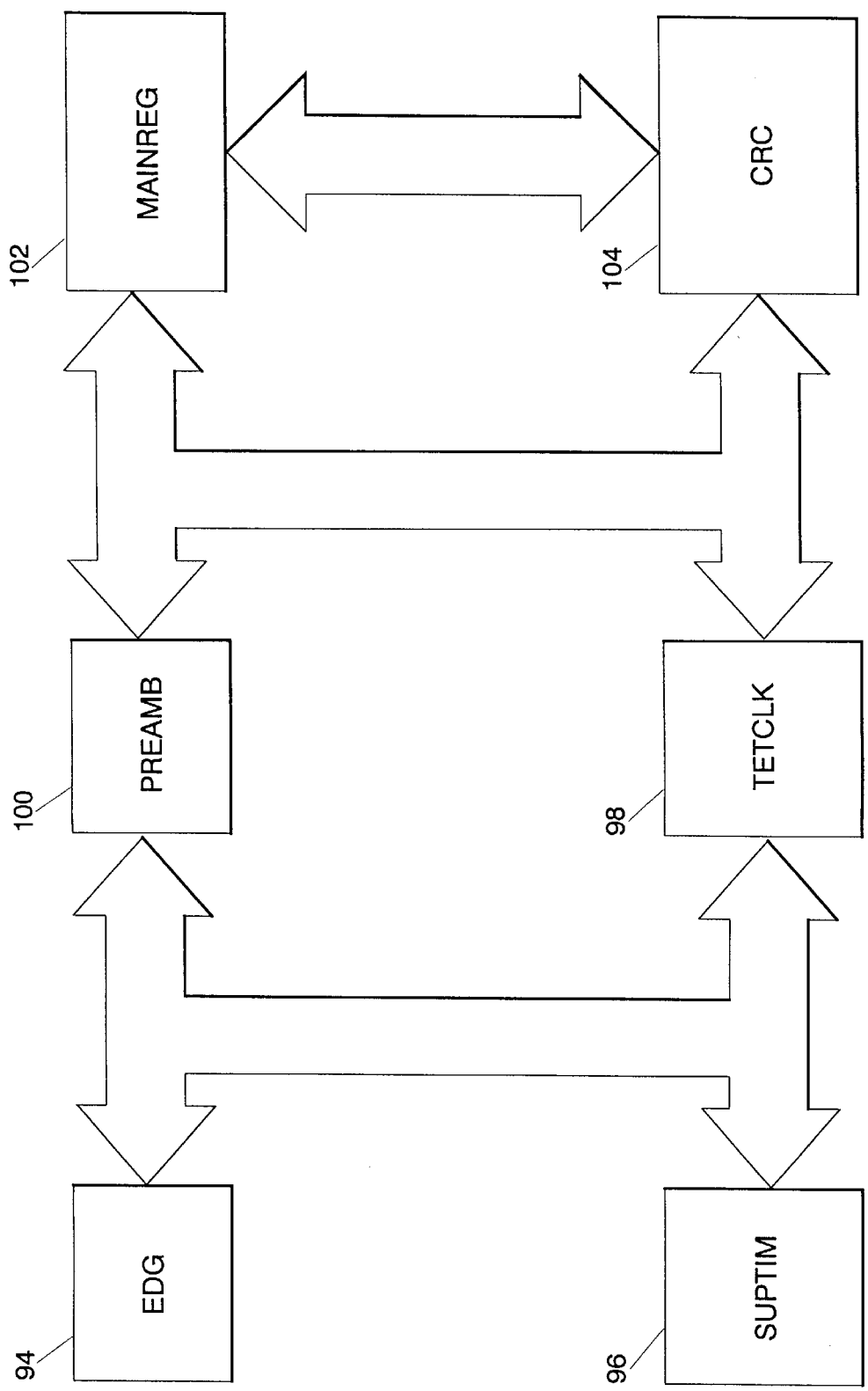
FIG. 6 is a block diagram illustrating functional blocks of an alternate embodiment of a message and CRC generator block of FIGS. 3A and 3B.

FIG. 6 illustrates a hierarchical functional block diagram of an alternate embodiment of the message and CRC generator block 36 of FIGS. 3A and 3B. Each of the blocks represents additional circuitry (not shown) that carries out the particular functions of that block. This additional circuitry would typically take the form of discrete analog and digital components, primitives within an ASIC or equivalent means well known in the art. An EDG block 94 is responsible for assembling status bits in order to construct the alarm status message. A SUPTIM block 96 monitors the output from the supervisory period timer 32 shown in FIGS. 3A and 3B. A TETCLK block 98 provides clock, timing, and control signals for the message and CRC generator. A PREAMB block 100 assembles the preamble of the various supervisory and non-supervisory messages generated by the message and CRC generator. A MAINREG block 102 provides the identification word unique to each alarm sensor transmitter and embedded in the supervisory message. A CRC block 104 provides error checking on the messages.

The method of the present invention does not rely for its success on multiple supervisory or alarm messages to be sent at each alarm event, nor is this method adversely effected by multiple transmissions. In addition, this method does not require a specific supervisory bit in the data transmitted. The embodiment described with reference to FIG. 2 may be realized in a fully integrated Application Specific Integrated Circuit (ASIC) containing each of the functions illustrated in FIG. 2. Those skilled in the art will recognize that the present invention could also be implemented using discrete circuitry with associated cost and total circuit area penalties.

Thus, while particular embodiments of the present invention have been shown and described, various modifications will be apparent to those skilled in the art, and therefore it is not intended that the invention be limited to the disclosed embodiment or to details thereof and departures may be made therefrom within the spirit and scope of the present invention.

What is claimed is:

1. A method for periodically self-testing a communications path in wireless alarm systems, which comprises:

timing a supervisory period to provide a delay between transmissions of supervisory messages;

generating a supervisory message;

generating a transmission power control signal comprising one of at least two states upon termination of said supervisory period; and transmitting said supervisory message at a reduced power level as indicated by said state of said transmission power control signal.

2. The method of claim 1, wherein said step of transmitting said supervisory message at a reduced power level further comprises identifying said supervisory message with a substantially unique identification word prior to transmitting said supervisory message.

3. The method of claim 1, further comprising the step of synchronizing operation of said step of generating a supervisory message with said step of transmitting said supervisory message.

4. The method of claim 1, further comprising generating an alarm status message in response to receipt of an alarm status signal from an alarm sensor;

generating said transmission power control signal in response to receipt of said alarm status signal from said alarm sensor; and transmitting said alarm status message at a normal power level as indicated by said state of said transmission power control signal.

5. The method of claim 4, wherein said step of transmitting said alarm status message at a normal power level further comprises identifying said alarm status message with a substantially unique identification word prior to transmitting said alarm status message.

6. The method of claim 4, further comprising the step of synchronizing operation of said step of generating an alarm status message with said step of transmitting said alarm status message.

7. An apparatus for periodically self-testing a communications path in wireless alarm systems, which comprises:

supervisory period timing means for timing a duration of a supervisory period existing between transmissions of supervisory messages;

means for outputting a supervisory period termination signal upon termination of said supervisory period;

message generation means for generating said supervisory message and a transmission power control signal, said transmission power control signal comprising one of at least two states; and transmission means for transmitting said supervisory message at a predetermined reduced power level in response to a first state of said transmission power control signal.

8. The apparatus of claim 7, wherein said message generation means further comprises means for generating an alarm status message and said transmission power control signal in response to receipt of an alarm status signal from an alarm sensor.

9. The apparatus of claim 8, wherein said transmission means transmits said alarm status message at a predetermined normal power level in response to said state of said transmission power control signal.

10. The apparatus of claim 7, wherein said apparatus is integrated in an application specific integrated circuit (ASIC).

11. The apparatus of claim 7, wherein said apparatus is integrated in a microcontroller.

12. The apparatus of claim 7, wherein said supervisory period timing means comprises a digital counter.

13. The apparatus of claim 7, wherein said supervisory period timing means comprises a variable time constant circuit, said variable time constant circuit being adjustable in order to vary said duration of said supervisory period.

14. The apparatus of claim 7, wherein said variable time constant circuit comprises a resistor and a capacitor.

15. The apparatus of claim 7, wherein said variable time constant circuit comprises a crystal.

16. The apparatus of claim 7, wherein said message generation means further comprises
an identification word stored in non-volatile memory and embedded in said supervisory message by said message generation means, wherein said identification substantially uniquely identifies said apparatus for transmitting supervisory messages at reduced power.

17. The apparatus of claim 7, wherein said message generation means further comprises an identification word stored in non-volatile memory and embedded in said alarm status message by said message generation means, said identification substantially uniquely identifies said apparatus for transmitting alarm messages at normal power.

18. The apparatus of claim 7, further comprising oscillator means for outputting a data clock signal which synchronizes said message generation means and a phase detection clock signal which synchronizes said transmission means.

19. The apparatus of claim 18, wherein said data clock signal and said phase detection clock signal are substantially in phase with each other.

20. The apparatus of claim 18, wherein said oscillator means further comprises a crystal oscillator.

21. The apparatus of claim 7, further comprising phase locking means for substantially maintaining correlation between a phase of a transmission signal with a phase of said phase detection signal.

22. The apparatus of claim 21, wherein said transmission means modulates said transmission signal with said generated supervisory message and outputs said modulated transmission signal.

23. The apparatus of claim 7, wherein said transmission means modulates said transmission signal with said generated alarm status message and outputs said modulated transmission signal.

24. The apparatus of claim 21, wherein said transmission means operates at radio frequencies.

25. The apparatus of claim 7, wherein said apparatus comprises discrete components.

26. An alarm sensor transmitter for use in a wireless alarm system, which comprises:

a supervisory period timer which times a duration of a supervisory period existing between transmissions of supervisory messages and outputs a supervisory period termination signal upon termination of said supervisory period;

a message generator which generates said supervisory message and a transmission power control signal in response to said supervisory period termination signal, said transmission power control signal comprising at least two states, said message generator generating an alarm status message and said transmission power control signal in response to receipt of an alarm status signal from an alarm sensor;

a radio frequency transmitter which transmits said supervisory message at a predetermined reduced power level in response to said state of said transmission power control signal and transmits said alarm status message at a predetermined normal power level in response to said state of said transmission power control signal, said radio frequency transmitter modulating said transmission signal with said generated supervisory message and said alarm status message and outputting said modulated transmission signal;

an oscillator which outputs a data clock signal for synchronizing said message generator and a phase detection clock signal for synchronizing said radio frequency transmitter, said data clock signal and said phase detection clock signal being substantially in phase with each other; and a phase lock loop circuit which substantially maintains correlation between a phase of said transmission signal and a phase of said phase detection clock signal.

27. The alarm sensor transmitter for use in wireless alarm systems of claim 26, wherein said apparatus is fully integrated in an application specific integrated circuit (ASIC).

28. The alarm sensor transmitter for use in wireless alarm systems of claim 26, wherein said apparatus is integrated in a microcontroller.

29. The alarm sensor transmitter for use in wireless alarm systems of claim 26, wherein said apparatus comprises discrete components.

* * * * *